Nov. 17, 1953    L. E. OBERHOLTZ ET AL    2,659,613
STEERING GEAR
Filed April 13, 1951
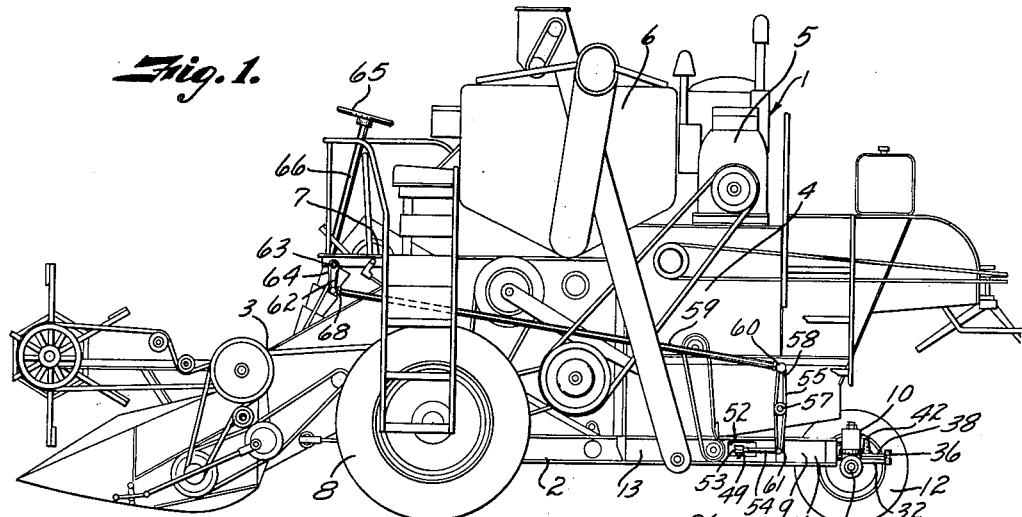
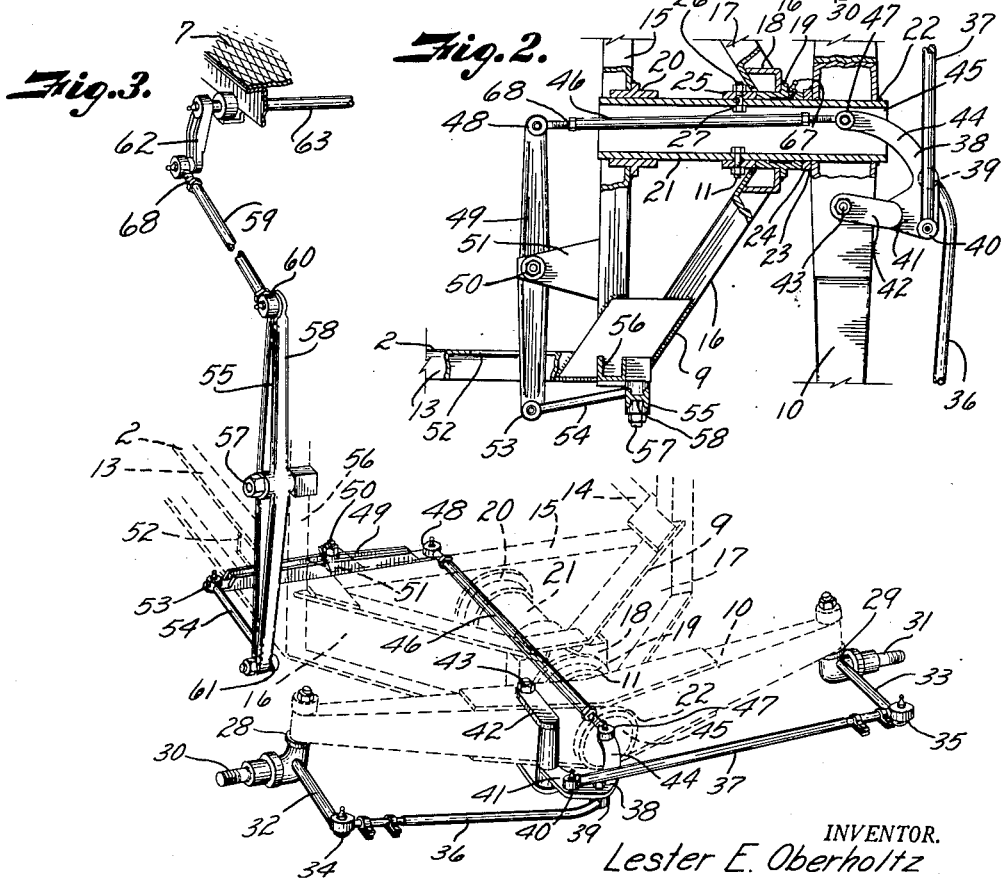
INVENTOR.
Lester E. Oberholtz
and Gene Allen
BY Fishburn + Mullendore
ATTORNEYS.

Patented Nov. 17, 1953

2,659,613

UNITED STATES PATENT OFFICE 2,659,613

STEERING GEAR

Lester E. Oberholtz and Gene Allen, Independence, Mo., assignors to Gleaner Harvester Corporation, Independence, Mo., a corporation of Delaware Application April 13, 1951, Serial No. 220,912

1 Claim. (Cl. 280—95)

This invention relates to a self-propelled combine or similar mobile machine which must be kept stable on irregular ground. Such machines are best supported on at least four wheels but a tri-point suspension is required between the wheels and body of the machine to avoid twisting and racking stress in the super-structure and to provide stability. Consequently, one of the axles is fixed while the other is adapted to rock with respect to the super-structure. Such an arrangement solves the supporting problem but it has been difficult to provide a steering mechanism for the wheels of the pivotally mounted axle.

It is therefore the principal object of the present invention to provide a steering mechanism for self-propelled combines and similar machines which is easy to steer and which is not affected by movement of the axle with respect to the super-structure of the machine on which a part of the steering apparatus is supported.

It is a further object of the invention to provide a steering mechanism wherein the leverages remain substantially constant regardless of the positions of the pivotal axle.

In accomplishing these and other objects of the invention as hereinafter pointed out, we have provided improved structure the preferred form of which is illustrated in the accompanying drawing wherein:

Fig. 1 is a side elevational view of a self-propelled combine equipped with a steering mechanism constructed in accordance with the present invention for steering the rear wheels, the nearest of the rear wheels being shown removed to better illustrate the steering mechanism.

Fig. 2 is a fragmentary plan view of a rear portion of the combine frame, rear axle, and the journal mounting of the axle, the journal mounting being shown in section to better illustrate the portions of the steering mechanism extending therethrough.

Fig. 3 is a perspective view of the steering mechanism shown in full lines with the axle and rear portion of the combine frame shown in dotted lines.

Referring more in detail to the drawings:

I designates a self-propelled combine including a main frame 2 carrying a forwardly suspended harvester and threshing unit 3, a separating unit 4, a power unit 5, a grain collecting bin 6 and an operator's platform 7 that are all directly mounted upon the main frame 2. The forward portion of the main frame is carried on main traction wheels 8 that are carried in spaced apart fixed relation with respect to the main frame so that the forward portion of the harvesting unit is kept in parallel relation with the ground over which the machine is propelled. The rear portion 9 of the frame is carried on an axle 10 having a journal connection 11 at the center thereof and with the rear portion of the main frame whereby the rear axle may tilt to maintain the wheels 12 thereof in contact with the ground while the traction wheels and journal mounting 11 form a tri-point support of the frame to avoid stresses and strains in the above described operating mechanisms of the machine.

In the illustrated instance, the main frame includes parallel side rails 13 and 14 that are connected at their rear ends by a cross rail 15 and rearwardly converging rails 16 and 17 that are interconnected by a bracket 18 carrying a bearing 19 in rearwardly spaced coaxial relation with a similar bearing 20 that is carried by the cross rail 15. The bearings are thus carried in the longitudinal center line of the machine and mid-way between the front wheels. Extending through the bearings 19 and 20 is a tubular journal 21 that is adapted to oscillate in the respective bearings and which has its rear end extending through the axle 10 and welded securely thereto as indicated at 22, whereby the journal and axle oscillate as a unit on a horizontal axis. Inserted between the bearing 19 and the axle and preferably welded to the axle as indicated at 23 is a thrust collar 24 which cooperates with a collar 25 engaging the forward end of the bearing 19 to prevent longitudinal or axial movement of the tubular journal within the bearings 19 or 20. The collar 25 is secured to the journal by fastening devices such as bolts 26 that extend through suitable registering openings 27 in the collar and the journal as shown in Fig. 2. The axle 10 may be a box-like section to provide a solid connection with the journal and the necessary rigidity in the axle structure. The axle extends beyond the ends of the side rails of the main frame and the ends thereof mount steering knuckles 28 and 29 carrying spindles 30 and 31 for rotatably mounting the rear wheels 12 thereon. The steering knuckles carry rearwardly extending arms 32 and 33 that are pivotally connected as at 34 and 35 with tie rods 36 and 37 which have their inner ends overlapping and pivotally connected with a bell crank 38 by means of pivotal connections 39 and 40 substantially in the manner as a conventional center point steering mechanism. The bell crank 38 has one arm 41 fixed to a yoke 42 that is pivotally connected with the axle at one side of the tubular journal by a pin or bolt 43. The other arm 44 of the bell crank curves forwardly toward the center of the axle and enters the open rear end 45 of the tubular journal 11 as best shown in Fig. 2. Extending through the tubular journal is a drag link 46 having ball and socket connection with the arm 44 as indicated at 47. The opposite end of the drag link 46 is connected by similar ball and socket joint 48 with a rocker arm 49. The rocker arm 49 is pivotally mounted as at 50 on a bracket 51 that is fixed to the cross rail 15 at a point intermediate the tubular journal and the side rail 13 of the main frame.

The rocker arm 49 operates through a slot-like opening 52 in the side rail 13 and is connected by a ball and socket joint 53 with a link 54. The link 54 is in turn connected with a rocker arm 55 that is pivotally mounted on an upright 56 of the main frame on a pivot pin or bolt 57 that extends laterally from the upright so that the rock lever 55 is mounted at the side of the separator housing with one arm 58 thereof extending upwardly to connect with a drag link 59 by pivotal connection 60 while the other arm extends downwardly to connect with the link 54 through a ball and socket connection 61. The link 59 is in turn connected by a crank arm 62 which is mounted on a rock shaft 63 carried under the platform 7. The rock shaft 63 is operatively connected with a gear reduction mechanism indicated by the housing 64 and is actuated by a steering wheel 65 mounted on a steering post 66 as in conventional practice.

With this arrangement it is obvious that the axle 10 may pivot relatively to the main frame without effecting the position of the rear wheels 12 because the connection between the parts of the steering mechanism that are carried by the main frame and those connected by the axle operates through the tubular journal. The bearings 19 and 20 may be provided with a suitable lubricant through pressure fittings 67. Likewise, the various pivot and ball and socket connections may be provided with similar pressure fittings to permit lubrication of the joints.

The drag links 59 and 46 are preferably provided with threaded adjustments 68 to maintain alignment of the wheels 12.

In operating the steering mechanism the wheel 65 is turned in the desired direction to effect rocking of the shaft 63 and swinging movement of the crank arm 62 to actuate the rock lever 55 by means of the drag link connection 59 which, in turn, rocks the lever 49 through the drag link 54 so as to effect reciprocatory movement of the drag link 46 through the tubular journal for swinging the bell crank lever on the pivot 43. The movement of the bell crank lever 38 on its yoke produces a similar movement of the knuckle arms 32 and 33 through the tie rods 36 and 37 so as to simultaneously turn the wheels 12 and effect desired turning movement of the machine. During this steering operation, the axle 10 is free to rock with respect to the frame so that there is no strains or stresses applied to the working mechanisms of the machine through the main frame or to the various steering members composing the steering mechanism.

From the foregoing, it is obvious that we have provided a steering mechanism which is composed of simple levers and link connections and which is adapted to operate the steerable ground wheels of a combine or similar machine through the tubular journal mounting for the axle which carries the wheels.

What we claim and desire to secure by Letters Patent is:

In a combine including a frame, wheels supporting the fore part of said frame at the sides thereof, a transverse axle having pivotal mounting on a rear part of the frame at a point midway of the width of the frame, steering knuckles on the respective ends of the axle and having steering arms, wheels carried by the steering knuckles, said pivotal mounting including a tubular trunnion having one end extending through the axle and the other end journalled on the frame, a bell crank pivotally mounted on the axle and having an arm registering with the end of the tubular trunnion which extends through the axle, links connecting the bell crank with said wheels mounted on the ends of the axle, and a steering mechanism including a drag link freely reciprocable through the trunnion and connected with said arm of the bell crank to effect steering of said wheels on the end of the axle, said steering arms, drag link and connecting links being substantially in a common plane extending through the axis of the trunnion on which the axle pivots.

LESTER E. OBERHOLTZ.
GENE ALLEN.

References Cited in the file of this patent

UNITED STATES PATENTS

| Number | Name | Date |
|---|---|---|
| 894,060 | Ruemelin | July 21, 1908 |
| 1,208,062 | Wheelock | Dec. 12, 1916 |
| 1,231,292 | Parrett | June 26, 1917 |
| 1,308,890 | Coleman | July 8, 1919 |
| 1,359,739 | Prescott | Nov. 23, 1920 |
| 1,677,419 | Wagner | July 17, 1928 |
| 2,223,274 | Tait | Nov. 26, 1940 |

FOREIGN PATENTS

| Number | Country | Date |
|---|---|---|
| 364,054 | Italy | Oct. 21, 1938 |